(12) United States Patent
Pang et al.

(10) Patent No.: US 11,755,164 B2
(45) Date of Patent: Sep. 12, 2023

(54) TOUCH SUBSTRATE AND TOUCH DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Bin Pang, Beijing (CN); Xiaodong Xie, Beijing (CN); Min He, Beijing (CN); Tengfei Zhong, Beijing (CN); Xue Zhao, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/776,897

(22) PCT Filed: May 13, 2021

(86) PCT No.: PCT/CN2021/093654
§ 371 (c)(1),
(2) Date: May 13, 2022

(87) PCT Pub. No.: WO2022/001412
PCT Pub. Date: Jan. 6, 2022

(65) Prior Publication Data
US 2022/0404933 A1 Dec. 22, 2022

(30) Foreign Application Priority Data
Jun. 29, 2020 (CN) .......................... 202010605969.7

(51) Int. Cl.
*G06F 3/044* (2006.01)
*G02F 1/1333* (2006.01)

(52) U.S. Cl.
CPC ........ *G06F 3/0446* (2019.05); *G02F 1/13338* (2013.01); *G06F 3/0443* (2019.05); *G06F 3/0448* (2019.05); *G06F 2203/04112* (2013.01)

(58) Field of Classification Search
None
See application file for complete search history.

(56) References Cited

U.S. PATENT DOCUMENTS

| 2017/0102804 A1* | 4/2017 | Kikukawa | ............... G06F 3/047 |
| 2019/0004657 A1* | 1/2019 | Koudo | .................... G06F 3/047 |

(Continued)

FOREIGN PATENT DOCUMENTS

| CN | 107765914 A | 3/2018 |
| CN | 108803944 A | 11/2018 |
| CN | 111651094 A | 9/2020 |

*Primary Examiner* — Amare Mengistu
*Assistant Examiner* — Sarvesh J Nadkarni
(74) *Attorney, Agent, or Firm* — IP&T Group LLP

(57) ABSTRACT

A touch substrate includes a substrate; a plurality of first touch electrodes disposed on the substrate and extending in a first direction; and a plurality of second touch electrodes disposed on the substrate and extending in a second direction intersecting with the first direction. The plurality of second touch electrodes are insulated from the plurality of first touch electrodes. Each first touch electrode and each second touch electrode both include a mesh structure and a plurality of first dummy electrodes; each first dummy electrode includes at least two line segments; the at least two line segments intersect with each other and have no closed region therebetween.

20 Claims, 13 Drawing Sheets

(56) References Cited

U.S. PATENT DOCUMENTS

| | | | |
|---|---|---|---|
| 2019/0107908 A1* | 4/2019 | Zeng | G06F 3/0445 |
| 2019/0114006 A1* | 4/2019 | Sakaue | G06F 3/0445 |
| 2019/0121466 A1* | 4/2019 | Sakaue | G06F 3/0446 |
| 2019/0243491 A1 | 8/2019 | Tsai et al. | |
| 2019/0377457 A1* | 12/2019 | Nakayama | G06F 3/0446 |
| 2022/0317806 A1* | 10/2022 | Fan | G06F 3/0446 |
| 2022/0317808 A1* | 10/2022 | Tong | G06F 3/0448 |

* cited by examiner

TOUCH SUBSTRATE AND TOUCH DISPLAY APPARATUS

CROSS-REFERENCE TO RELATED APPLICATIONS

This application is a national phase entry under 35 USC 371 of International Patent Application No. PCT/CN2021/093654, filed on May 13, 2021, which claims priority to Chinese Patent Application No. 202010605969.7, filed on Jun. 29, 2020, which are incorporated herein by reference in their entirety.

TECHNICAL FIELD

The embodiments of the present disclosure relate to a touch substrate and a touch display apparatus.

BACKGROUND

In touch display apparatuses, touch electrodes with metal mesh structures have good performances such as a fast signal transmission speed, and are gradually accepted, and popularized and applied.

SUMMARY

In an aspect, a touch substrate is provided. The touch substrate includes: a substrate; a plurality of first touch electrodes disposed on the substrate and extending in a first direction; and a plurality of second touch electrodes disposed on the substrate and extending in a second direction intersecting with the first direction, and the plurality of second touch electrodes being insulated from the plurality of first touch electrodes. Each first touch electrode and each second touch electrode both include a mesh structure and a plurality of first dummy electrodes. The mesh structure includes a plurality of first meshes, and each first mesh is provided with at least one first dummy electrode therein, and each first dummy electrode is insulated from a first mesh in which the first dummy electrode is located. Orthogonal projections of the plurality of first touch electrodes on the substrate intersect with orthogonal projections of the plurality of second touch electrodes on the substrate to constitute a plurality of intersection regions. In each intersection region, an orthogonal projection of a mesh structure in a first touch electrode on the substrate and an orthogonal projection of a mesh structure in a second touch electrode on the substrate constitute a projected mesh structure. The projected mesh structure has a plurality of second meshes, an orthogonal projection of each first dummy electrode on the substrate is located in a second mesh, and each first dummy electrode includes at least two line segments. The at least two line segments are arranged to intersect, and the at least two line segments have no closed region therebetween.

In some embodiments, each first dummy electrode and a side of a first mesh in which the first dummy electrode is located have a predetermined distance therebetween.

In some embodiments, the predetermined distance is in a range of 4 µm to 12 µm, inclusive.

In some embodiments, each second mesh includes: first sides, the first sides being a portion of the orthogonal projection of the mesh structure in the first touch electrode on the substrate; and second sides, the second sides being a portion of the orthogonal projection of the mesh structure in the second touch electrode on the substrate. An orthogonal projection of a first dummy electrode in the first touch electrode on the substrate and a second side of a second mesh in which the first dummy electrode is located are connected to each other or partially coincided with each other. And/or, an orthogonal projection of a first dummy electrode in the second touch electrode on the substrate and a first side of a second mesh in which the first dummy electrode is located are connected to each other or partially coincided with each other.

In some embodiments, the first mesh is in a shape of a square, a rectangle, a rhombus or a regular hexagon, and the second mesh is in a shape of a square, a rectangle, or a rhombus.

In some embodiments, an area of the first mesh is an integer multiple of an area of the second mesh.

In some embodiments, the at least two line segments in each first dummy electrode intersect at a same point, and the point is located at a center of a second mesh in which the point is located.

In some embodiments, each first dummy electrode includes two line segments intersecting at a same point, and the two line segments are respectively parallel to two adjacent sides of the second mesh in which the two line segments are located.

In some embodiments, first meshes in each first touch electrode and first meshes in each second touch electrode are all first rhombus meshes. Two first dummy electrodes in the first touch electrode are disposed in a first rhombus mesh in the first touch electrode, and are arranged at intervals in a direction of a first diagonal of the first rhombus mesh. Two first dummy electrodes in the second touch electrode are disposed in a first rhombus mesh in the second touch electrode, and are arranged at intervals in a direction of a second diagonal of the first rhombus mesh. The first diagonal of the first rhombus mesh in the first touch electrode and the second diagonal of the first rhombus mesh in the second touch electrode are spatially perpendicular to each other.

In some embodiments, the second mesh is a second rhombus mesh, and all sides of the second rhombus mesh are respectively parallel to all sides of the first rhombus mesh, and an area of the second rhombus mesh is a quarter of an area of the first rhombus mesh.

In some embodiments, each first dummy electrode includes two line segments intersecting at a same point, and an orthogonal projection of the point of the two line segments on the substrate is located at a center of the second rhombus mesh in which the two line segments are located, and the two line segments are respectively parallel to two adjacent sides of the second rhombus mesh in which the two line segments are located.

In some embodiments, the touch substrate further includes a plurality of second dummy electrodes disposed in a same layer as the first touch electrodes and located between two adjacent first touch electrodes; and/or, a plurality of third dummy electrodes disposed in a same layer as the second touch electrodes and located between two adjacent second touch electrodes.

In some embodiments, a distance between two adjacent first touch electrodes is in a range of 40 µm to 50 µm, inclusive; and/or, a distance between two adjacent second touch electrodes is in a range of 40 µm to 50 µm, inclusive.

In some embodiments, the plurality of first touch electrodes are a plurality of driving electrodes, and the plurality of second touch electrodes are a plurality of sensing electrodes. Or, the plurality of first touch electrodes are the plurality of sensing electrodes, and the plurality of second touch electrodes are the plurality of driving electrodes.

In some embodiments, the touch substrate further includes an insulating layer disposed between the plurality of second touch electrodes and the plurality of first touch electrodes, so that the plurality of second touch electrodes are insulated from the plurality of first touch electrodes.

In another aspect, a touch display apparatus is provided. The touch display apparatus includes the touch substrate according to any of the above embodiments.

In some embodiments, the substrate of the touch substrate is a cover plate. Or, the substrate of the touch substrate is a color filter substrate. Or, the touch display apparatus further includes a display substrate, and the substrate of the touch substrate is an encapsulation layer for encapsulating the display substrate.

In some embodiments, the touch display apparatus is a liquid crystal display apparatus, and the liquid crystal display apparatus includes an array substrate and an opposite substrate that are disposed opposite to each other, and liquid crystals between the array substrate and the opposite substrate. The substrate of the touch substrate is the opposite substrate, and the plurality of first touch electrodes and the plurality of second touch electrodes in the touch substrate are located on a side of the opposite substrate away from the liquid crystals.

In some embodiments, the touch display apparatus further includes a polarizer disposed on a side of the plurality of first touch electrodes and the plurality of second touch electrodes in the touch substrate away from the substrate of the touch substrate.

In some embodiments, the touch display apparatus further includes an adhesive layer disposed between the polarizer and the touch substrate. A resistivity of the adhesive layer is in a range of $10^8$ Ω·m to $10^{11}$ Ω·m, inclusive.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals to which the embodiments of the present disclosure relate.

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or examples(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

Figure 1A:
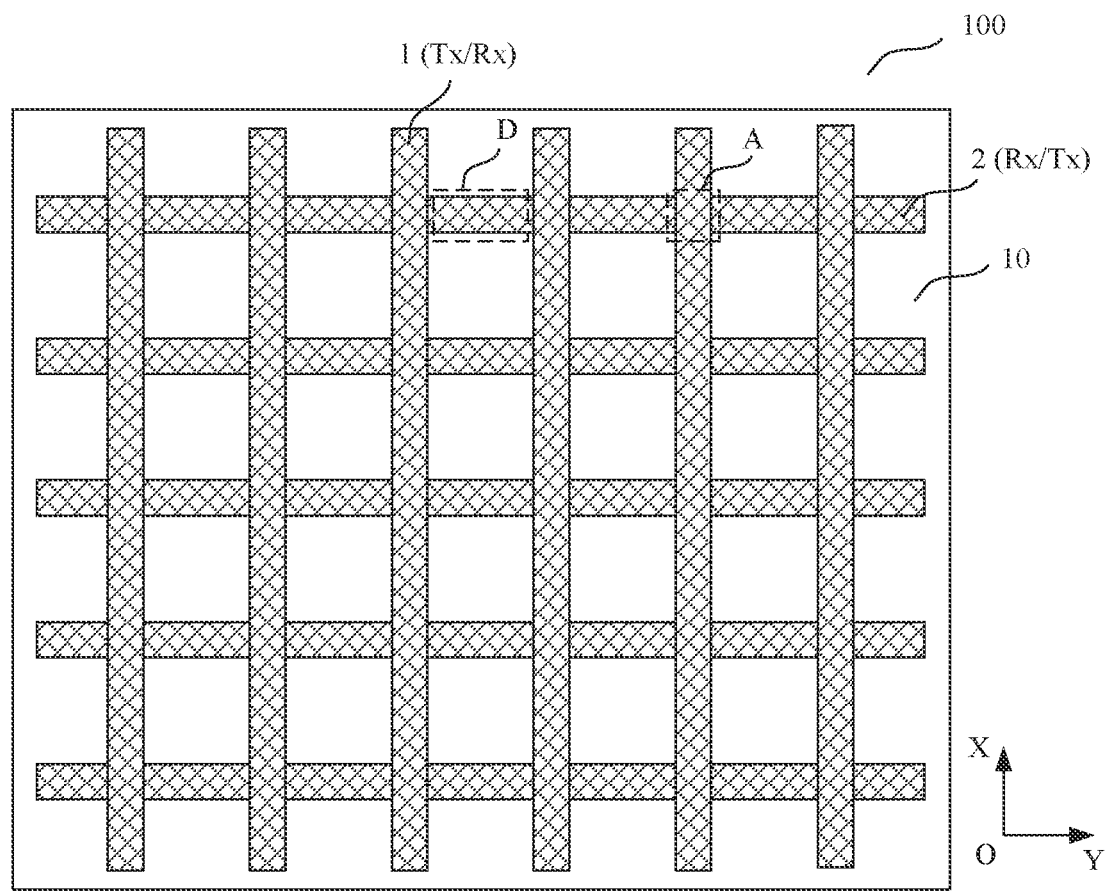
FIG. 1A is a structural diagram of a touch substrate, in accordance with some embodiments.

Some embodiments of the present disclosure provide a touch substrate 100. As shown in FIG. 1A, the touch substrate 100 includes a substrate 10, a plurality of first touch electrodes 1 and a plurality of second touch electrodes 2 that are disposed on the substrate 10. The plurality of first touch electrodes 1 extend in a first direction OX, the plurality of second touch electrodes 2 extend in a second direction OY, and the plurality of second touch electrodes 2 are insulated from the plurality of first touch electrodes 1. The first direction OX and the second direction OY intersect. For example, the first direction OX and the second direction OY may be perpendicular to each other.

Figure 2A:
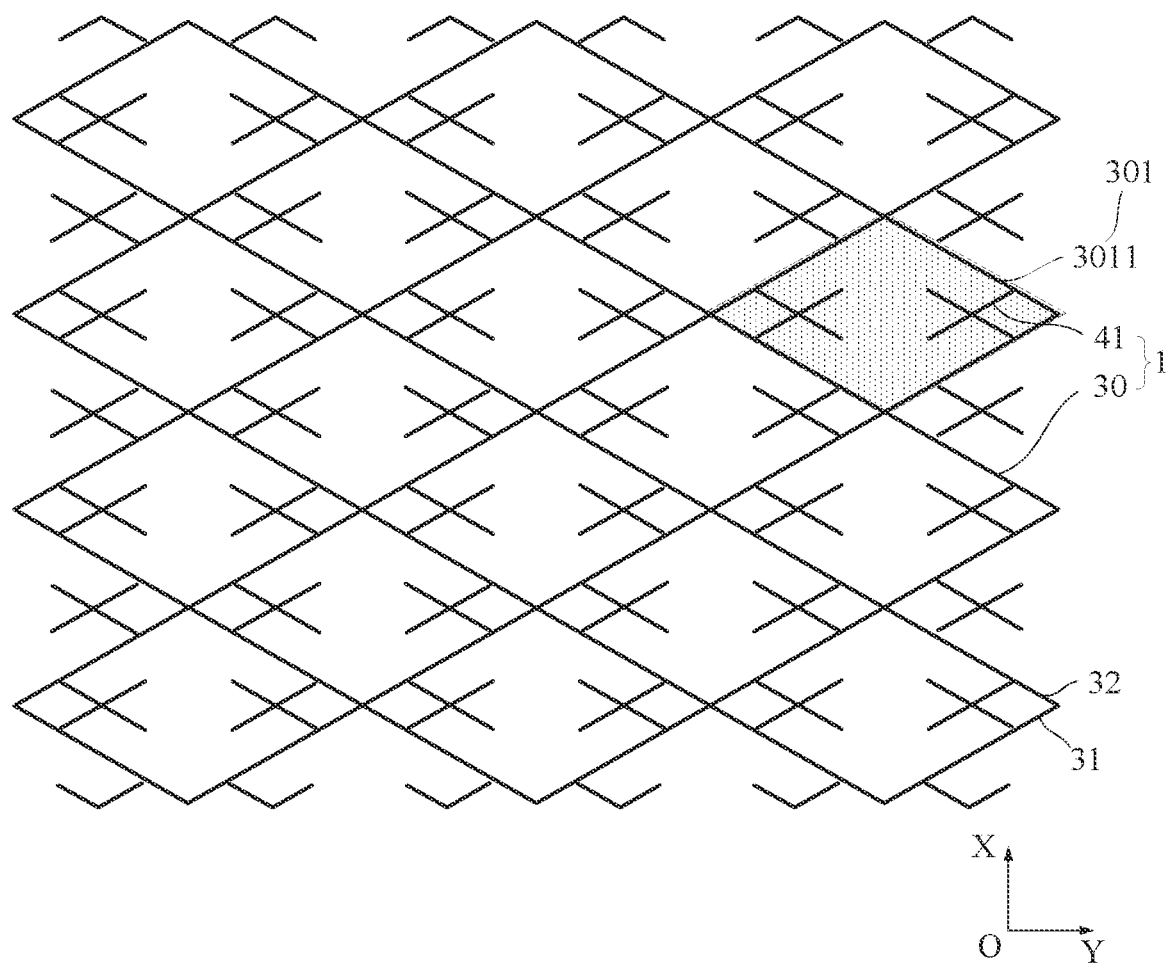
FIG. 2A is a structural diagram of a first touch electrode, in accordance with some embodiments.
Figure 2B:
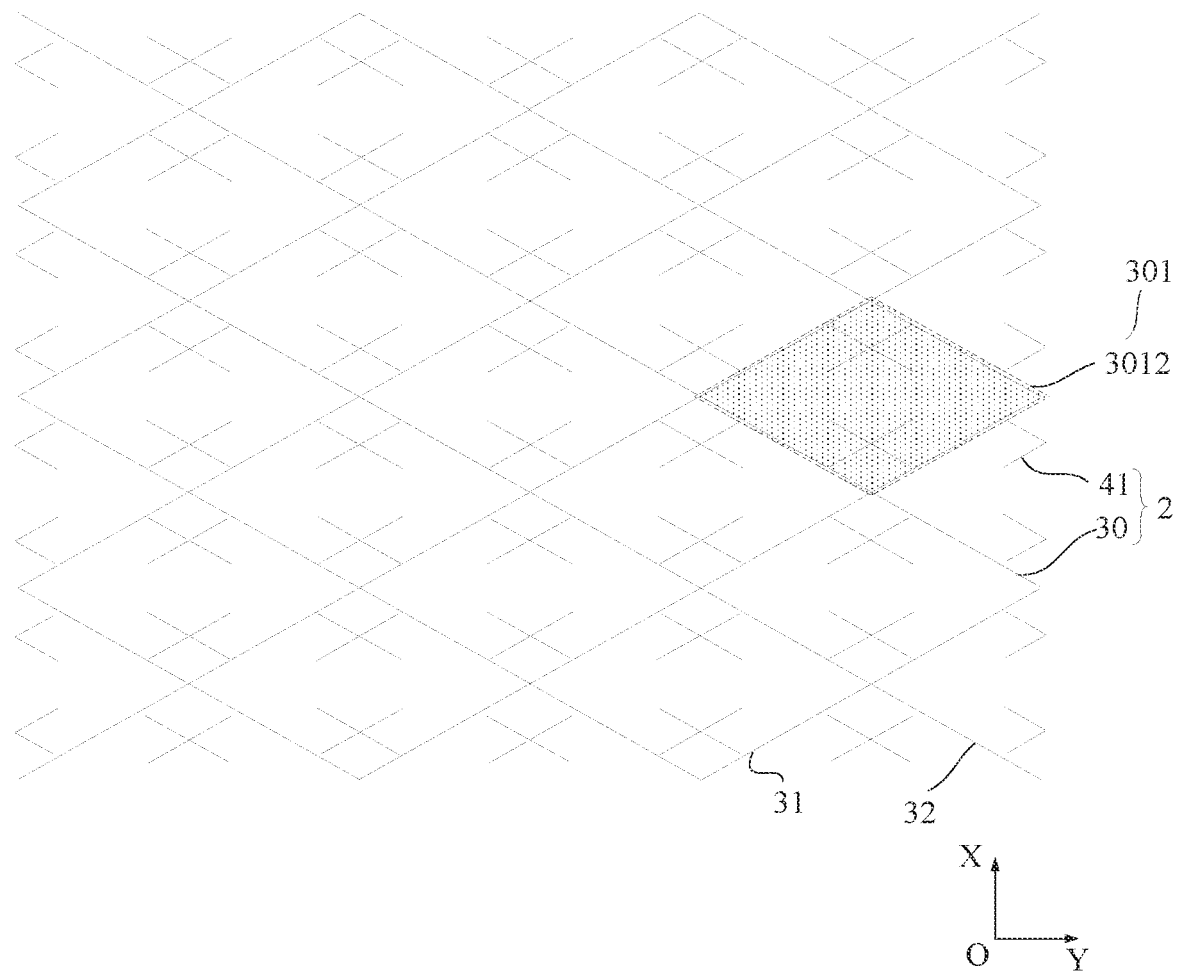
FIG. 2B is a structural diagram of a second touch electrode, in accordance with some embodiments.

As shown in FIGS. 2A and 2B, each first touch electrode 1 and each second touch electrode 2 both include a mesh structure 30 and a plurality of first dummy electrodes 41. The mesh structure 30 is formed by intersecting a plurality of wires (e.g., a plurality of first wires 31 and a plurality of second wires 32 in FIG. 2A, or a plurality of first wires 31 and a plurality of second wires 32 in FIG. 2B), and the plurality of wires may be used to transmit electrical signals.

The mesh structure 30 includes a plurality of first meshes 301, and each first mesh 301 is provided therein with at least one first dummy electrode 41 (e.g., FIGS. 2A and 2B are each illustrated by considering an example in which each first mesh 301 is provided two first dummy electrodes 41 therein, and it can be understood that the number of the first dummy electrode(s) in the first mesh 301 is not limited in the embodiments and corresponding figures), and each first dummy electrode 41 is insulated from a first mesh 301 where the first dummy electrode 41 is located.

Figure 3A:
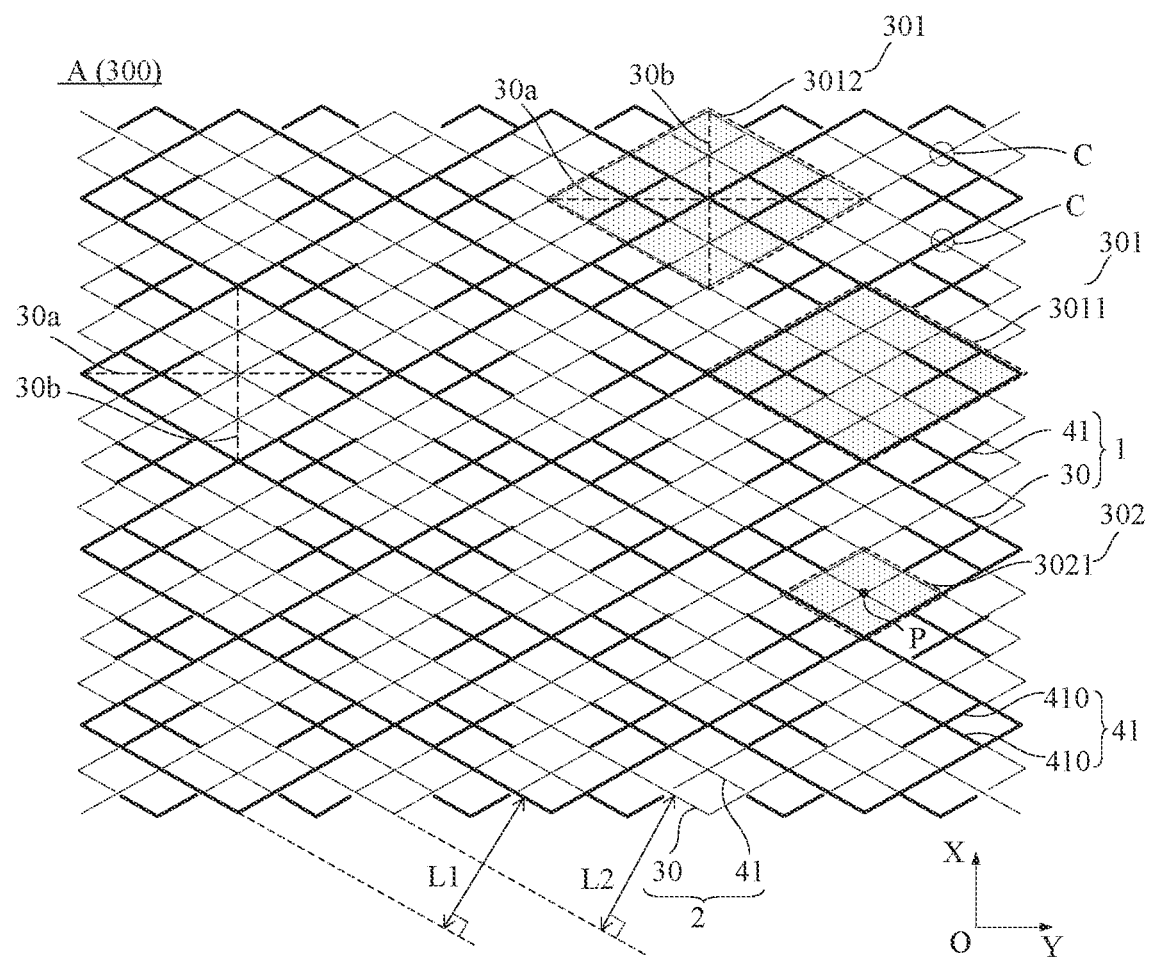
FIG. 3A is a structural diagram of an overlap region between a first touch electrode and a second touch electrode, in accordance with some embodiments.

As shown in FIGS. 1A and 3A, orthogonal projections of the plurality of first touch electrodes 1 on the substrate 10 intersect with orthogonal projections of the plurality of second touch electrodes 2 on the substrate 10, so as to form a plurality of intersection regions A. In each intersection region A, an orthogonal projection of a mesh structure 30 in a first touch electrode 1 on the substrate 10 and an orthogonal projection of a mesh structure 30 in a second touch electrode 2 on the substrate 10 form a projected mesh structure 300. The projected mesh structure has a plurality of second meshes 302, an orthogonal projection of each first dummy electrode 41 on the substrate 10 is located in a second mesh 302, and each first dummy electrode 41 includes at least two line segments 410. The at least two line segments are arranged to intersect, and there is no closed region between/among the at least two line segments.

Referring to FIG. 3A, in each intersection region A, there are a plurality of overlap regions C where orthogonal projections of the plurality of wires in the first touch electrode 1 overlap with orthogonal projections of the plurality of wires in the second touch electrode 2. Since each wire of the first touch electrode 1 is electrically insulated from each wire of the second touch electrode 2, a mutual capacitance may exist between two corresponding wires at each overlap region C. Here, it is worth pointing out that in some related arts, an arrangement density of wires in each first touch electrode 1 and an arrangement density of wires in each second touch electrode 2 are usually large, and therefore there are a large number of overlap regions C in each intersection region A, which results in a large mutual capacitance value between the first touch electrode 1 and the second touch electrode 2, thereby causing a serious resistance-capacitance delay of a touch circuit in a touch display apparatus adopting the touch substrate, and thus reducing a signal transmission speed of the touch display apparatus. Based on this, in some other related arts, by increasing a size of each first mesh 301 in each first touch electrode 1 and a size of each first mesh 301 in each second touch electrode 2, the arrangement density of the wires in the first touch electrode 1 and the arrangement density of the wires in the second touch electrode 2 in each intersection region A are reduced. However, in a case where the size of each first mesh 301 is set to be large, human eyes may distinguish each first mesh 301. Especially in a non-intersection region other than the plurality of intersection regions A (e.g., a non-intersection region D shown in FIG. 1A), the first mesh 301 is more easily perceived by the human eyes. Further, when the touch display apparatus is used, the presence of the plurality of first touch electrodes 1 and the plurality of second touch electrodes 2 may be perceived, so that a display effect of the touch display apparatus may be reduced.

However, in the touch substrate provided in the present embodiments, since the first meshes 301 of the plurality of first touch electrodes 1 and the first meshes 301 of the plurality of second touch electrodes 2 are all provided with the first dummy electrodes 41 therein, and each first dummy electrode is insulated from the first mesh 301 where the first dummy electrode is located (that is, there is no electrical signal transmission in each first dummy electrode), the arrangement density of the wires for transmitting the electrical signals in the plurality of first touch electrodes 1 and the arrangement density of the wires for transmitting the electrical signals in the plurality of second touch electrodes 2 are relatively low (e.g., referring to FIG. 3A, a distance L1 between two adjacent second wires in the first touch electrode 1 increases from a range of 100 μm to 200 μm in the related art to a range of 300 μm to 400 μm, and a distance L2 between two adjacent second wires in the second touch electrode 2 increases from a range of 100 μm to 200 μm in the related art to a range of 300 μm to 400 μm). That is to say, the mutual capacitance value between the first touch electrode 1 and the second touch electrode 2 is relatively low, so that the resistance-capacitance delay of the touch circuit in the touch display apparatus may be improved, and the signal transmission speed of the touch display apparatus may be improved.

Moreover, the first meshes 301 of the plurality of first touch electrodes 1 and the first meshes 301 of the plurality of second touch electrodes 2 are all provided with the first dummy electrodes 41 therein, and in the intersection region A, the orthogonal projection of each first dummy electrode 41 on the substrate 10 is located in the second mesh 302. As a result, the first mesh 301 and the second mesh 302 are both divided into a plurality of regions with smaller sizes, so that the first mesh 301 and the second mesh 302 are not easily observed by the human eyes. That is, it may avoid the human eyes from perceiving the presence of the plurality of first touch electrodes 1 and the plurality of second touch electrodes 2, thereby ensuring the display effect of the touch display apparatus.

A size of the first mesh 301 refers to a maximum distance between two opposite sides of the first mesh 301, and a size of the second mesh 302 refers to a maximum distance between two opposite sides of the second mesh 302.

Figure 4:
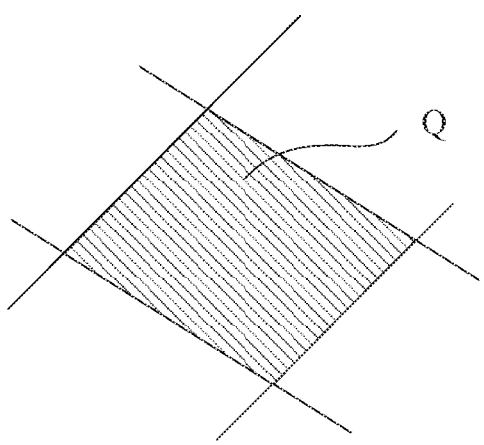
FIG. 4 is a structural diagram of a first dummy electrode, in accordance with some embodiments.

FIG. 4 shows a first dummy electrode 41 in some embodiments. As shown in FIG. 4, the first dummy electrode 41 has a closed region Q. However, it is found through research that when a touch operation is performed on the touch display apparatus having the touch substrate, charges are easily accumulated on the mesh structures 30 and the first dummy electrodes 41 of the plurality of both first touch electrodes 1 and the plurality of second touch electrodes 2. The charges on the mesh structures 30 are easily conducted away, but the first dummy electrodes 41 are mostly isolated from each other and of rhombic structures shown in FIG. 4, which results in that induced charges on the first dummy electrodes 41 are difficult to be dissipated. A difference in charges on the two (i.e., the mesh structures 30 and the first dummy electrodes 41) will cause uneven distribution of the electric field in the whole display region, thereby causing the whole screen of the touch display apparatus to display mesh patterns of light and dark during touch.

For example, for a liquid crystal touch display apparatus, especially for an on-cell product without a cover glass (i.e., a display apparatus with the first touch electrodes 1 and the second touch electrodes 2 all disposed outside a liquid crystal cell, only a polarizer provided on a side of the first touch electrode 1 and the second touch electrode 2 away from the liquid crystal cell, and no cover glass further provided on the polarizer; wherein the liquid crystal cell mainly includes an array substrate and an opposite substrate that are arranged opposite to each other, and liquid crystals disposed between the array substrate and the opposite substrate), the polarizer, the touch substrate and ions in the liquid crystal cell are in a balanced state in a normal situation, positive charges and negative charges are evenly distributed, and a displayed image is uniform.

When a finger or a glove rubs against the polarizer, it is easy to generate charges, so that the polarizer is polarized, the balance of the distribution of the positive charges and negative charges is broken, and then the touch substrate senses corresponding charges and polarization. In this case, the mesh structure of the first touch electrode and the mesh structure of the second touch electrode are each complete and connected, and the induced charges are easily conducted away. However, the first dummy electrode is a closed shape and of a rhombic structure as shown in FIG. 4, and its structure makes the charges thereon not easily dissipated. Therefore, the difference between the mesh structure and the first dummy electrode will eventually cause the balance state of the ions in the liquid crystal cell to be broken, and affect the distribution of the electric field in the liquid crystal cell, thereby causing deflection of the liquid crystals to be changed. There is a difference between a display effect of a changed region and a display effect of a non-changed region, so that the whole screen of the liquid crystal touch display apparatus will appear mesh patterns of light and dark during touch.

Figure 5A:
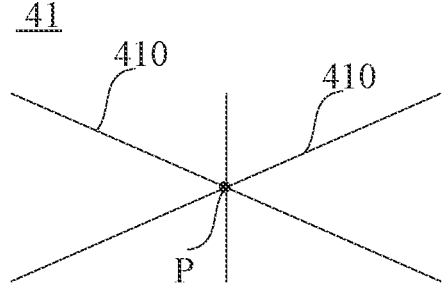
FIG. 5A is a structural diagram of another first dummy electrode, in accordance with some embodiments.

In the touch substrate provided in the embodiments, the orthogonal projection of each first dummy electrode 41 on the substrate 10 is located in the second mesh 302, and the orthogonal projection of each first dummy electrode 41 on the substrate 10 includes at least two line segments, the at least two line segments are arranged to intersect, and there is no closed region between/among the at least two line segments. For example, the first dummy electrode in the embodiments may be the first dummy electrode 41 shown in FIG. 2A, 26, or 3A. For another example, the first dummy electrode in the embodiments may also be the first dummy electrode 41 shown in FIGS. 5A to 5C. In this way, compared with the first dummy electrode shown in FIG. 4, the charges on the first dummy electrode provided in the embodiments are more easily conducted away, so that a phenomenon of the mesh patterns of light and dark on the screen is not easy to occur during touch.

Figure 3B:
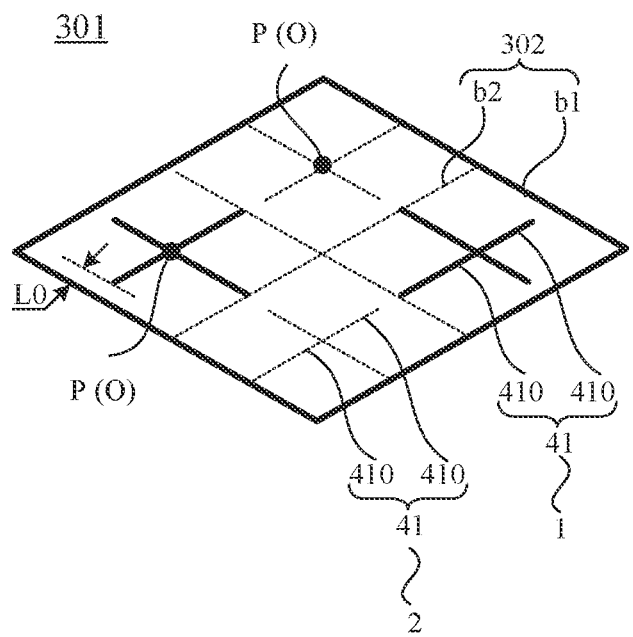
FIG. 3B is a structural diagram of another overlap region between a first touch electrode and a second touch electrode, in accordance with some embodiments.

In some embodiments, as shown in FIG. 3B, the first dummy electrode 41 and a side of a first mesh 301 where the first dummy electrode 41 is located have a predetermined distance L0 therebetween, which enables the first dummy electrode 41 to be insulated from the first mesh 301 where the first dummy electrode 41 is located.

For example, the predetermined distance is in a range of 4 µm to 12 µm, inclusive. For example, the predetermined distance may be 4 µm, 8 µm, or 12 µm. In this case, a gap between the first dummy electrode 41 and the first mesh 301 where the first dummy electrode 41 is located is not easily observed by the human eyes, which may improve an optical uniformity of the touch substrate 100. In addition, it is possible to effectively prevent short circuit between the first dummy electrode 41 and the first mesh 301 where the first dummy electrode 41 is located. It can be understood that, in the embodiments, in a case where the predetermined distance is equal to or close to 4 µm, it is less easy for the human eyes to observe the gap, and the optical uniformity of the touch substrate 100 may be further improved. In a case where the predetermined distance is equal to or close to 8 µm, the short circuit between the first dummy electrode 41 and the first mesh 301 where the first dummy electrode 41 is located may be more effectively prevented.

Figure 3C:
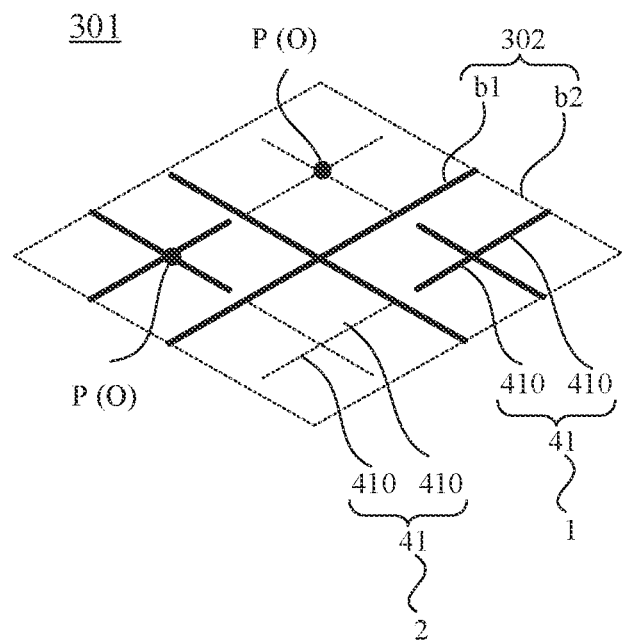
FIG. 3C is a structural diagram of yet another overlap region between a first touch electrode and a second touch electrode, in accordance with some embodiments.

In some embodiments, referring to FIGS. 3A to 3C, each second mesh 302 includes first sides b1 and second sides b2. The first sides b1 are a portion of an orthogonal projection of the mesh structure 30 in the first touch electrode 1 on the substrate. The second sides b2 are a portion of an orthogonal projection of the mesh structure 30 in the second touch electrode 2 on the substrate. An orthogonal projection of a first dummy electrode 41 in the first touch electrode 1 on the substrate and a second side b2 of a second mesh 302 where the first dummy electrode 41 is located are connected to each other or partially coincided with each other; and/or, an orthogonal projection of a first dummy electrode 41 in the second touch electrode 2 on the substrate and a first side b1 of a second mesh 302 where the first dummy electrode 41 is located are connected to each other or partially coincided with each other.

In the embodiments, the orthogonal projection of the first dummy electrode 41 in the first touch electrode 1 on the substrate and the second side b2 of the second mesh 302 where the first dummy electrode 41 is located are connected to each other or partially coincided with each other, so that it can be seen from a side of the first touch electrode 1 away from the substrate, the orthogonal projection of the first dummy electrode 41 in the first touch electrode 1 on the substrate is connected to the second side b2 of the second mesh 302 where the first dummy electrode 41 is located. That is, there is no gap between the orthogonal projection of the first dummy electrode 41 in the first touch electrode 1 on the substrate and the second side b2 of the second mesh 302 where the first dummy electrode 41 is located. As a result, the number of the gaps may be reduced, and the optical uniformity may be improved, thereby avoiding the distribution of light and dark due to too many gaps.

The orthogonal projection of the first dummy electrode 41 in the second touch electrode 2 on the substrate and the first side b1 of the second mesh 302 where the first dummy electrode 41 is located are connected to each other or partially coincided with each other, so that it can be seen from a side of the second touch electrode 2 away from the substrate, the orthogonal projection of the first dummy electrode 41 in the second touch electrode 2 on the substrate is connected to the first side b1 of the second mesh 302 where the first dummy electrode 41 is located. That is, there is no gap between the orthogonal projection of the first dummy electrode 41 in the second touch electrode 2 on the substrate and the first side b1 of the second mesh 302 where the first dummy electrode 41 is located. As a result, the number of the gaps may be further reduced, and the optical uniformity may be improved, thereby avoiding the distribution of light and dark due to too many gaps.

The first mesh 301 may be in a shape of a square, a rectangle, a rhombus or a regular hexagon. Correspondingly, the second mesh 302 may be in a shape of a square, a rectangle, or a rhombus. For example, in a case where the shape of the first mesh 301 is the square, the second mesh 302 formed by overlapping may be a square with a same shape and a different size. For another example, in a case where the shape of the first mesh 301 is the rectangle, the second mesh 302 formed by overlapping may be a rectangle with a same shape and a different size. For yet another example, as shown in FIGS. 3A to 3C, in a case where the shape of the first mesh 301 is the rhombus, the second mesh 302 formed by overlapping may be a rhombus with a same shape and a different size. For yet another example, in a case where the shape of the first mesh 301 is the hexagon, the shape of the second mesh 302 formed by overlapping may be a rhombus obtained by trisecting the hexagon. It can be understood that the shape of the first mesh 301 and the shape of the second mesh 302 are not limited in the embodiments, as long as the first mesh 301 of the first touch electrode 1 and the first mesh 301 of the second touch electrode 2 may overlap to make the orthogonal projections of the two on the substrate form the second mesh 302.

In some embodiments, an area of the first mesh 301 is an integer multiple of an area of the second mesh 302. For example, as shown in FIGS. 3A to 3C, a first mesh 301 may be divided into four second meshes 302 with same shapes and same sizes. That is, the area of the first mesh 301 is four times the area of the second mesh 302. Of course, in some other examples, the area of the first mesh 301 may also be three times or five times the area of the second mesh 302, and a multiple relationship therebetween is not limited here.

In the embodiments, the area of the first mesh 301 is set to be the integer multiple of the area of the second mesh 302, so that the second meshes 302 in the formed projected mesh structure are uniformly arranged, which may help to reduce the formation of moiré fringes, thereby reducing an effect of the moiré fringes on the display effect of the touch display apparatus adopting the touch substrate.

In some embodiments, referring to FIGS. 3A to 3C and 5A, the at least two line segments 410 in each first dummy electrode 41 intersect at a same point P, and the point P is located at a center O of a second mesh 302 where the point P is located. Such a design may facilitate the first dummy electrode to divide the second mesh 302 uniformly, so that the optical uniformity may be further improved and the display effect of the touch display apparatus adopting the touch substrate may be improved.

Figure 5B:
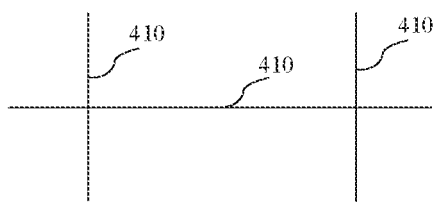
FIG. 5B is a structural diagram of yet another first dummy electrode, in accordance with some embodiments.
Figure 5C:
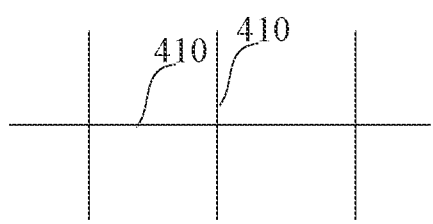
FIG. 5C is a structural diagram of yet another first dummy electrode, in accordance with some embodiments.

In addition, in some other examples, referring to FIG. 5B, all the line segments 410 in each first dummy electrode 41 may also intersect at two points. For example, FIG. 5B shows a condition where three line segments intersect at two points. In yet some other examples, referring to FIG. 5C, all the line segments 410 in each first dummy electrode 41 may also intersect at three points. For example, FIG. 5C shows a condition where four line segments intersect at three points.

It can be understood that the number of the points formed by the intersection of all line segments in the first dummy electrode 41 is not limited in the embodiments, as long as it is satisfied that there is no closed region Q shown in FIG. 4 between/among all the line segments in the first dummy electrode 41. In addition, the embodiments do not limit a shape of each line segment in the first dummy electrode. For example, the shape of the line segment in the first dummy electrode may be a straight line or a curved line.

In some embodiments of the present disclosure, referring to FIGS. 3A to 3C, each first dummy electrode 41 includes two line segments 410 intersecting at a same point, and the two line segments are respectively parallel to two adjacent sides of the second mesh 302. In this way, the region in the second mesh 302 may be uniformly divided, so as to improve the optical uniformity of the touch substrate. The shape of the second mesh 302 includes, but is not limited to the above-mentioned square, rectangle, or rhombus.

In some embodiments, the first meshes 301 in the first touch electrode 1 and the first meshes 301 in the second touch electrode 2 are all first rhombus meshes, and each first rhombus mesh has a first diagonal 30a and a second diagonal 30b that are perpendicular to each other. Referring to FIGS. 2A and 2B, in the text, for convenience of description, the first rhombus mesh in the first touch electrode 1 is referred to as a first sub-rhombus mesh 3011, and the first rhombus mesh in the second touch electrode 2 is referred to as a second sub-rhombus mesh 3012. It can be understood that the first rhombus mesh in the first touch electrode 1 and the first rhombus mesh in the second touch electrode 2 have the same shape and size. That is, the first sub-rhombus mesh 3011 and the second sub-rhombus mesh 3012 have the same shape and size.

As shown in FIG. 2A, two first dummy electrodes 41 in the first touch electrode 1 are disposed in a first sub-rhombus mesh 3011 and are arranged at intervals in a direction of the first diagonal (e.g. the second directions OY) of the first sub-rhombus mesh 3011. As shown in FIG. 2B, two first dummy electrodes 41 in the second touch electrode 2 are disposed in a second sub-rhombus mesh 3012 and are arranged at intervals in a direction of the second diagonal (e.g. the first direction OX) of the second sub-rhombus mesh 3012. In addition, referring to FIG. 3A, the first diagonal 30a of the first sub-rhombus mesh 3011 and the second diagonal 30b of the second sub-rhombus mesh 3012 are spatially perpendicular to each other. In the above design scheme, the second mesh 302 formed by an orthogonal projection of the first sub-rhombus mesh 3011 on the substrate and an orthogonal projection of the second sub-rhombus mesh 3012 on the substrate, which are in the intersection region A shown in FIG. 3A, is in a shape of a quadrilateral, and the orthogonal projection of each first dummy electrode 41 on the substrate can be located in a quadrilateral second mesh 302, which may help to improve the optical uniformity of the touch substrate.

On this basis, for example, referring to FIG. 3A, the second mesh 302 is a second rhombus mesh 3021, and all sides of the second rhombus mesh 3021 are respectively parallel to all sides of the first rhombus mesh (e.g., the first sub-rhombus mesh 3011 and the second sub-rhombus mesh 3012), and an area of the second rhombus mesh 3021 is a quarter of an area of the first rhombus mesh. In this way, the first mesh 301 may be divided into four second meshes 302 with the same shape and size, so that the uniformity of the distribution of the second meshes 302 may be improved, and the optical uniformity of the touch substrate may be further improved.

For example, as shown in FIG. 3B, each first dummy electrode 41 includes two line segments that intersect at a same point P, an orthogonal projection of the point of the two line segments on the substrate is located at a center O of the second rhombus mesh, and the two line segments are parallel to two adjacent sides of the second rhombus mesh. In this case, the two line segments of the first dummy electrode 41 are both straight line segments, and the orthogonal projection of the first dummy electrode 41 on the substrate may divide the second mesh (i.e., the second rhombus mesh) into four regions with the same shape and size, which may further make the touch substrate have a good optical uniformity.

For example, a pair of opposite included angles of the first rhombus mesh are both 60°, and another pair of opposite included angles are both 120°. Correspondingly, a pair of opposite included angles of the second rhombus mesh are both 60°, and another pair of opposite included angles are both 120°.

Figure 1B:
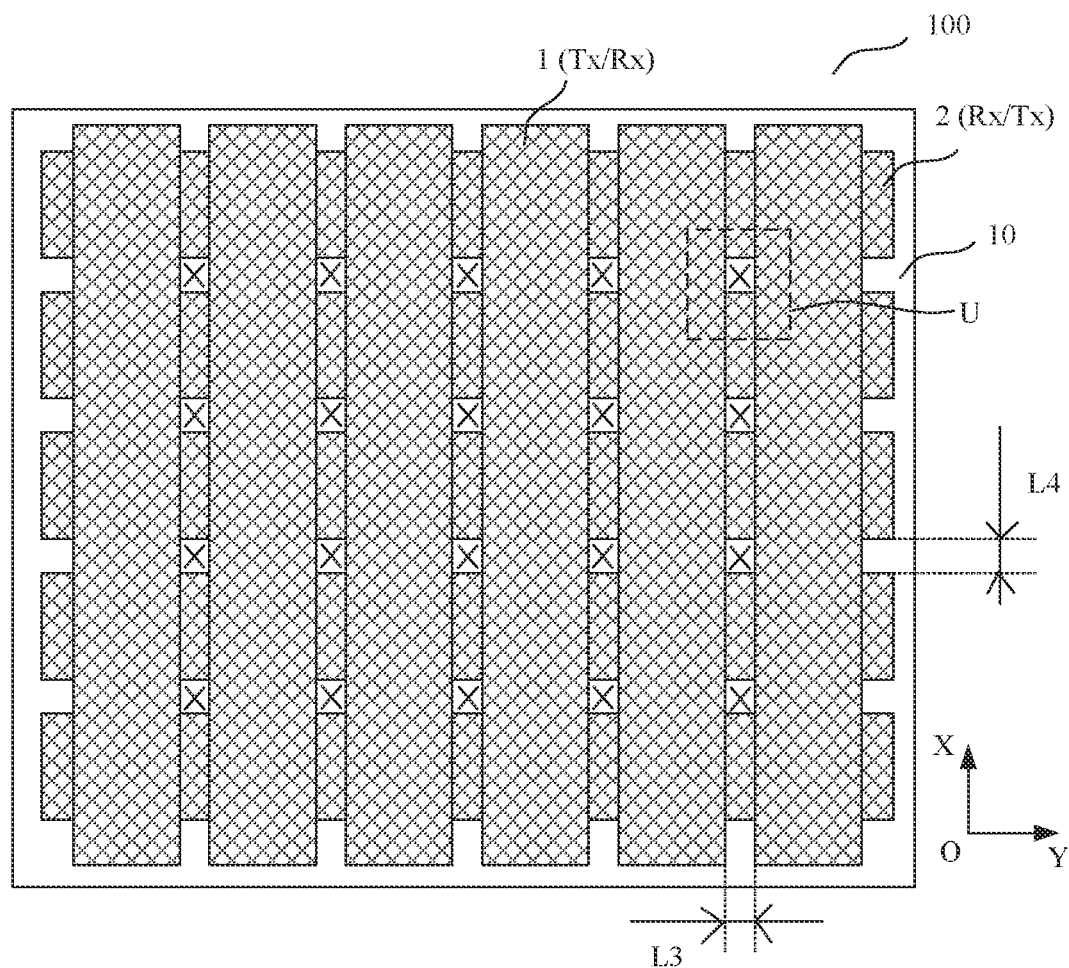
FIG. 1B is a structural diagram of another touch substrate, in accordance with some embodiments.
Figure 3D:
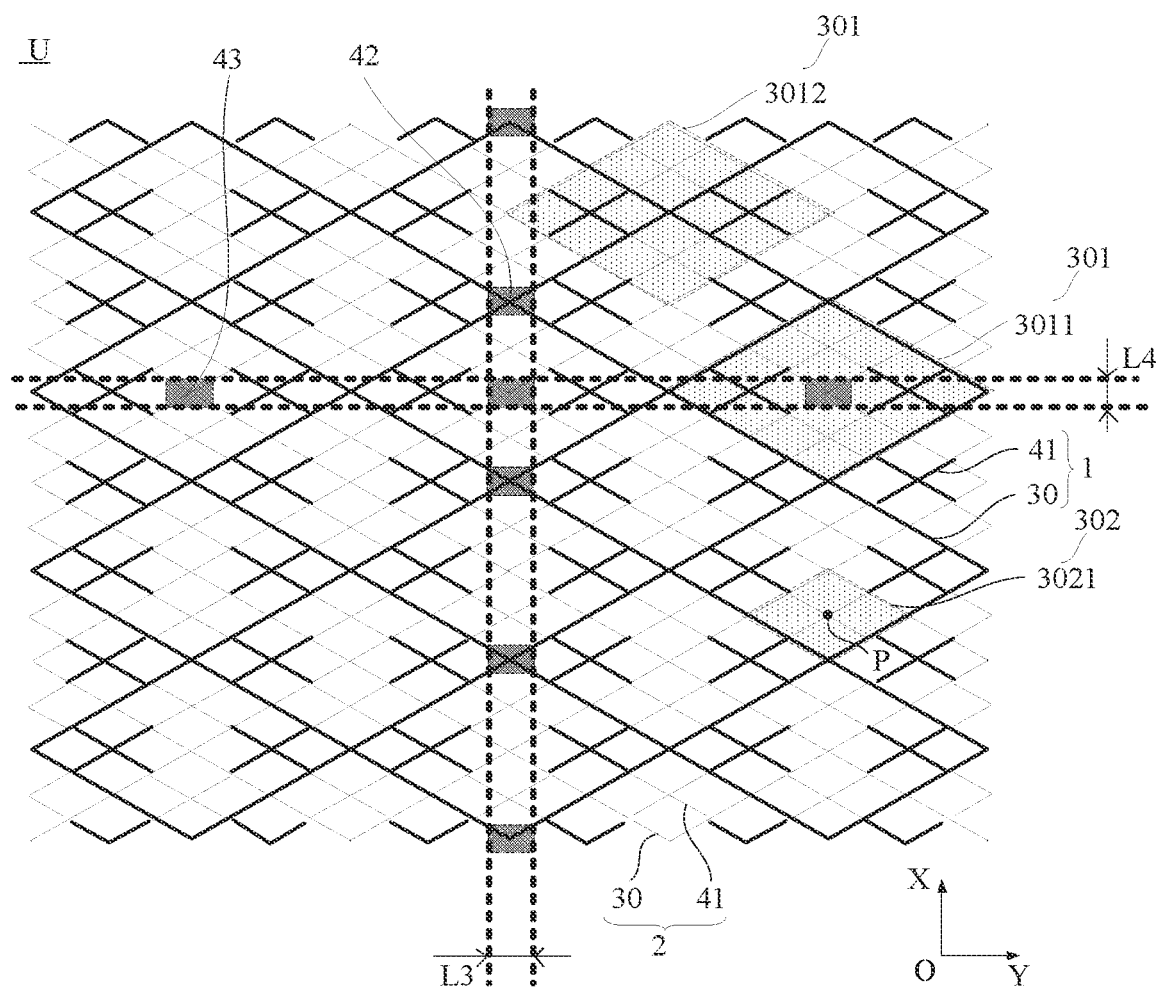
FIG. 3D is an enlarged view of a structure of the touch substrate in FIG. 1B at a U position.

In some embodiments, referring to FIGS. 1B and 3D, the touch substrate 100 further includes a plurality of second dummy electrodes 42 disposed in a same layer as the first touch electrodes 1 and located between two adjacent first touch electrodes 1, and/or a plurality of third dummy electrodes 43 disposed in a same layer as the second touch electrodes 2 and located between two adjacent second touch electrodes 2. It can be understood that each second dummy electrode 42 is insulated from the mesh structure 30 in the first touch electrode 1, and each third dummy electrode 43 is insulated from the mesh structure 30 in the second touch electrode 2.

This arrangement makes it difficult for the human eyes to observe the mesh patterns of light and dark in a region between the two adjacent first touch electrodes 1 and/or a region between the two adjacent second touch electrodes 2, so as to achieve a full version design. As a result, the region between the two adjacent first touch electrodes 1 and regions where the first touch electrodes 1 are located may reach a substantially same optical uniformity, and the region between the two adjacent second touch electrodes 2 and regions where the second touch electrodes 2 are located may reach a substantially same optical uniformity.

For example, referring to FIGS. 1B and 3D, a distance L3 between the two adjacent first touch electrodes 1 is in a range of 40 μm to 50 μm, inclusive. For example, the distance L3 between the two adjacent first touch electrodes 1 may be 40 μm, 45 μm or 50 μm. And/or, a distance L4 between the two adjacent second touch electrodes 2 is in a range of 40 μm to 50 μm, inclusive. For example, the distance L4 between the two adjacent second touch electrodes 2 may be 40 μm, 45 μm or 50 μm. Here, it is worth pointing out that, in the related art, a width of the first touch electrode 1 and/or a width of the second touch electrode 2 are both several millimeters, for example, in a range of 4 mm to 5 mm, inclusive. Compared with the related art, the distance between the two adjacent first touch electrodes 1 and/or the distance between the two adjacent second touch electrodes 2 can be reduced in the present embodiments, so that touch sensitivity of the touch substrate 100 may be improved, and the overall optical uniformity of the touch substrate 100 may be further improved.

Referring to FIG. 3D, it will be noted that there is an overlap portion between the region between the two adjacent first touch electrodes 1 and the region between the two adjacent second touch electrodes 2, and the overlap portion may be provided with a second dummy electrode 42 therein, or may be provided with a third dummy electrode 43 therein (as shown in FIG. 3D).

In addition, a shape of the second dummy electrode 42 and a shape of the third dummy electrode 43 may be the same as the shape of the first dummy electrode 41 described above. For example, in FIG. 3D, the shape of the second dummy electrode 42 and the shape of the third dummy electrode 43 may both include two straight line segments that intersect at a same point.

In some embodiments of the present disclosure, a material of the mesh structure 30 in the first touch electrode 1 and a material of the plurality of first dummy electrodes 41 in the first touch electrode 1 are the same conductive material. A material of the mesh structure 30 in the second touch electrode 2 and a material of the plurality of first dummy electrodes 41 in the second touch electrode 2 are the same conductive material.

In this case, since the mesh structure 30 and the plurality of first dummy electrodes 41 of the first touch electrode 1 or the mesh structure 30 and the plurality of first dummy electrodes 41 of the second touch electrode 2 have the same material, when the plurality of first touch electrodes 1 or the plurality of second touch electrodes 2 are fabricated, the mesh structure 30 and the first dummy electrodes 41 may be fabricated in a same process, thereby simplifying the fabrication processes.

On this basis, for example, a material of the second dummy electrode 42 is the same as the material of the first touch electrode 1, so that the second dummy electrode 42 and the first touch electrode 1 may be fabricated in a same process, thereby simplifying the fabrication processes.

For example, a material of the third dummy electrode 43 is the same as the material of the second touch electrode 2, so that the third dummy electrode 43 and the second touch electrode 2 may be fabricated in a same process, thereby simplifying the fabrication processes.

For example, the material of the mesh structure 30 includes at least one of metals such as copper, silver, aluminum, titanium, or nickel, and the material of the first dummy electrode 41 includes at least one of metals such as copper, silver, aluminum, titanium, or nickel.

In some embodiments of the present disclosure, as shown in FIGS. 1A and 1B, the plurality of first touch electrodes 1 are a plurality of driving electrodes Tx, and the plurality of second touch electrodes 2 are a plurality of sensing electrodes Rx. Alternatively, the plurality of first touch electrodes 1 are the plurality of sensing electrodes Rx, and the plurality of second touch electrodes 2 are the plurality of driving electrodes Tx.

Figure 6:
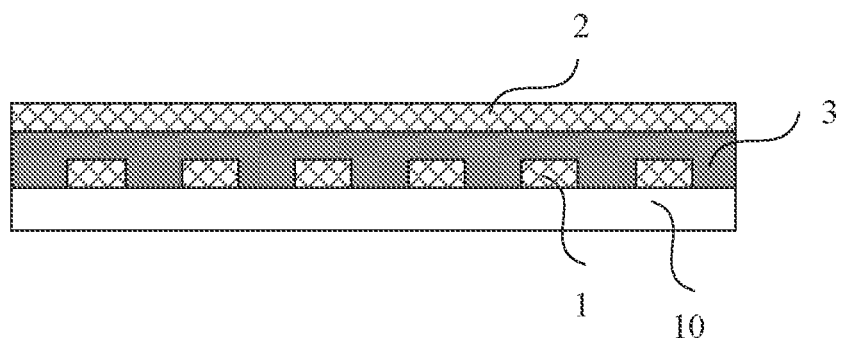
FIG. 6 is a cross-sectional view of a touch substrate, in accordance with some embodiments.

For example, as shown in FIG. 6, the touch substrate 100 further includes an insulating layer 3 disposed between the plurality of second touch electrodes and the plurality of first touch electrodes. The insulating layer 3 may insulate the plurality of second touch electrodes 2 from the plurality of first touch electrodes 1.

Some embodiments of the present disclosure provide a touch display apparatus 001. As shown in FIGS. 7A to 7E, the touch display apparatus 001 includes the touch substrate 100 as described above, and thus the touch display apparatus 001 has all the beneficial effects of the touch substrate 100 as described above.

Figure 7A:
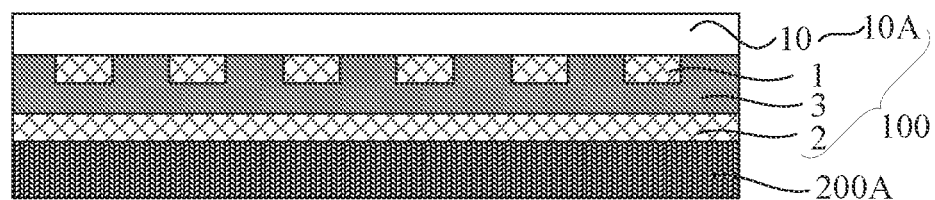
FIG. 7A is a cross-sectional view of a touch display apparatus, in accordance with some embodiments.

For example, as shown in FIG. 7A, the substrate 10 of the touch substrate 100 is a cover plate 10A. In this case, the touch display apparatus 001 further includes a display panel 200A. The touch substrate 100 may be directly disposed on a display surface of the display panel 200A (in this case, the first touch electrodes 1 and the second touch electrodes 2 are all located between the cover plate 10A and the display panel 200A), so that a purpose of protecting the display panel 200A and a purpose of achieving a touch function may both be achieved. The display panel may be a panel having a display function such as a liquid crystal display panel or an organic light-emitting diode display panel.

Figure 7B:
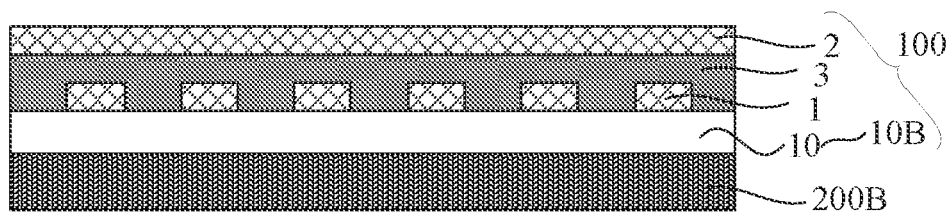
FIG. 7B is a cross-sectional view of another touch display apparatus, in accordance with some embodiments.

For another example, as shown in FIG. 7B, the substrate 10 of the touch substrate 100 is a color filter substrate 10B. In this case, the touch display apparatus 001 may include a white-light organic light-emitting diode display panel 200B, and the touch substrate 100 may be directly disposed on a display surface of the white-light organic light-emitting diode display panel 200B (in this case, the first touch electrodes 1 and the second touch electrodes 2 are all located on a side of the color filter substrate 10B away from the white-light organic light-emitting diode display panel 200B), so that a purpose of full-color display and a purpose of achieving the touch function may both be achieved.

Figure 7C:
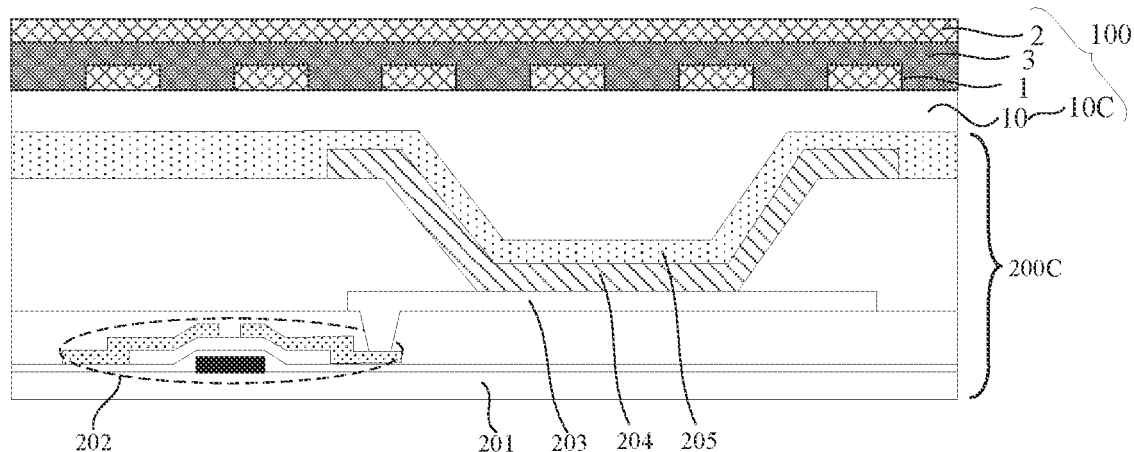
FIG. 7C is a cross-sectional view of yet another touch display apparatus, in accordance with some embodiments.

For yet another example, as shown in FIG. 7C, the substrate 10 of the touch substrate 100 is an encapsulation layer 10C for encapsulating a display substrate 2000. Each sub-pixel in the display substrate 2000 includes a light-emitting device and a driving circuit disposed on a base 201. The driving circuit includes a plurality of thin film transistors 202. The light-emitting device includes an anode 203, a light-emitting functional layer 204 and a cathode 205, and the anode 203 is electrically connected to a drain of a thin film transistor 202, serving as a driving transistor, among the plurality of thin film transistors 202, so as to drive the light-emitting functional layer 204 to emit light through the thin film transistor. The arrangement of the encapsulation layer 10C may prevent the thin film transistors 202, the anode 203, the cathode 205, and the light-emitting functional layer 204 between the anode 203 and the cathode 205 in the display substrate from being corroded by water and oxygen.

Figure 7D:
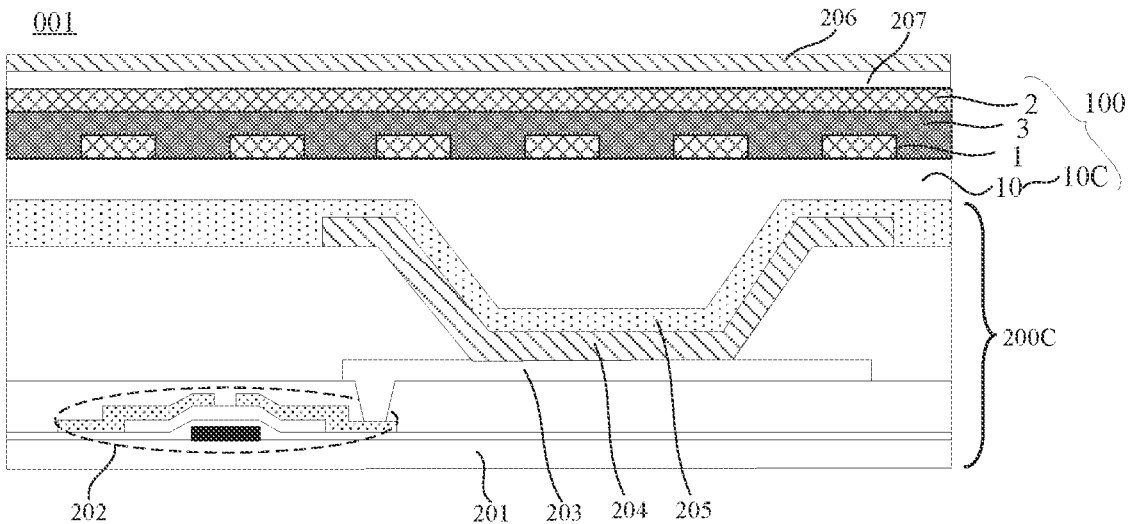
FIG. 7D is a cross-sectional view of yet another touch display apparatus, in accordance with some embodiments.

On the basis of the touch display apparatus 001 shown in FIG. 7C, for example, referring to FIG. 7D, the touch display apparatus 001 may further include a polarizer 206. In this case, the plurality of first touch electrodes 1 and the plurality of second touch electrodes 2 in the touch substrate 100 are located between the polarizer 206 and the substrate 10 (e.g., the encapsulation layer 10C) of the touch substrate 100. In this embodiment, the arrangement of the polarizer 206 may reduce a reflection effect of the screen, so that a good display effect may be achieved.

For example, as shown in FIG. 7D, the touch display apparatus 001 may further includes an adhesive layer 207, the adhesive layer 207 is disposed between the polarizer 206 and the touch substrate 100, and a resistivity of the adhesive layer 207 is in a range of $10^8$ Ω·m to $10^{11}$ Ω·m, inclusive. Here, it is worth noting that it is found through research that, in a case where the resistivity of the adhesive layer 207 is equal to or close to $10^8$ Ω·m, the induced charges on the touch substrate 100 are easy to be conducted away quickly, the short circuit may be less likely to occur between the plurality of first touch electrodes 1 on the touch substrate 100, and the short circuit may also be less likely to occur between the plurality of second touch electrodes 2 on the touch substrate 100. In a case where the resistivity of the adhesive layer 207 is equal to or close to $10^{11}$ Ω·m, the short circuit phenomenon may be prevented well on a basis of conducting the induced charges away. Therefore, the resistivity of the adhesive layer 207 is set to be in the range of $10^8$ Ω·m to $10^{11}$ Ω·m, the touch sensitivity and display effect may be improved. In some examples, the resistivity of the adhesive layer 207 is in a range of $10^9$ Ω·m to $10^{10}$ Ω·m. Such arrangement may well balance a conducting effect of the induced charges and a risk of short circuit. Optionally, the adhesive layer 207 may be a pressure sensitive adhesive (PSA) layer.

Optionally, a support layer may further be provided on opposite sides of the polarizer 206. The support layer may be a triacetyl cellulose (TAC) film. The polarizer 206 may be supported by providing the support layer, which may help to prevent the polarizer 206 from being broken.

Optionally, a material of the polarizer 206 may be polyvinyl alcohol (PVA).

Figure 7E:
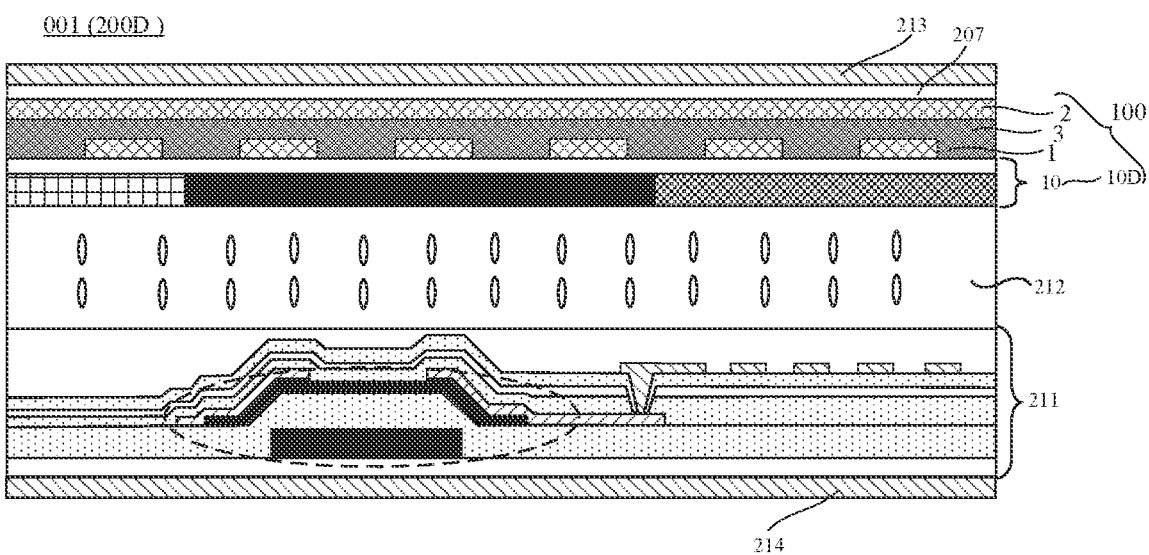
FIG. 7E is a cross-sectional view of yet another touch display apparatus, in accordance with some embodiments.

In some embodiments, as shown in FIG. 7E, the touch display apparatus 001 may also be a liquid crystal display apparatus 200D. In this case, the substrate 10 of the touch substrate 100 is an opposite substrate 10D of the liquid crystal display apparatus. Moreover, in some examples, the opposite substrate 10D may be a color filter substrate.

As shown in FIG. 7E, a structure of the liquid crystal display apparatus includes an array substrate 211, the opposite substrate 10D and liquid crystals 212 provided between the array substrate 211 and the opposite substrate 10D. The plurality of first touch electrodes 1 and the plurality of second touch electrodes 2 in the touch substrate 100 are all located on a side of the opposite substrate 10D away from the liquid crystals 212.

Based on this, as shown in FIG. 7E, the liquid crystal display apparatus further includes a first polarizer 213 disposed on the side of the opposite substrate 10D away from the liquid crystals 212 and a second polarizer 214 disposed on a side of the array substrate 11 away from the liquid crystals 212. In this case, the first polarizer 213 is located on a side of the plurality of first touch electrodes 1 and the plurality of second touch electrodes 2 in the touch substrate 100 away from the opposite substrate 10D.

The first polarizer 213 and the second polarizer 214 may be made of a same material as the above polarizer 206. In addition, opposite sides of the first polarizer 213 and opposite sides of the second polarizer 214 may provide with the above support layers thereon respectively. The beneficial effects that may be achieved by arranging the support layer here are the same as the content described above, which will not be repeated here.

Based on this, for example, as shown in FIG. 7E, the above adhesive layer 207 may also be disposed between the first polarizer 213 of the liquid crystal display apparatus and the touch substrate 100. The beneficial effects that may be achieved by arranging the adhesive layer 207 here are the same as the content described above, which will not be repeated.

For example, the touch display apparatus 001 provided by the embodiments of the present disclosure is one of an on-cell touch display apparatus, an in-cell touch display apparatus, or a one glass solution (OGS) touch display apparatus.

For example, the touch display apparatus 001 is any apparatus that displays images whether in motion (e.g., a video) or fixed (e.g., a still image), and regardless of text or image. More specifically, it is contemplated that the described embodiments may be implemented in or associated with a variety of electronic devices. The variety of electronic devices may include (but are not limited to), for example, mobile phones, wireless devices, personal digital assistants (PDAs), hand-held or portable computers, global positioning system (GPS) receivers/navigators, cameras, MPEG-4 Part 14 (MP4) video players, video cameras, game consoles, watches, clocks, calculators, TV monitors, flat panel displays, computer monitors, car displays (e.g., odometer displays), navigators, cockpit controllers and/or displays, camera view displays (e.g., rear view camera displays in a vehicle), electronic photos, electronic billboards or signs, projectors, architectural structures, packaging and aesthetic structures (e.g. displays for displaying an image of a piece of jewelry), etc.

Figure 8:
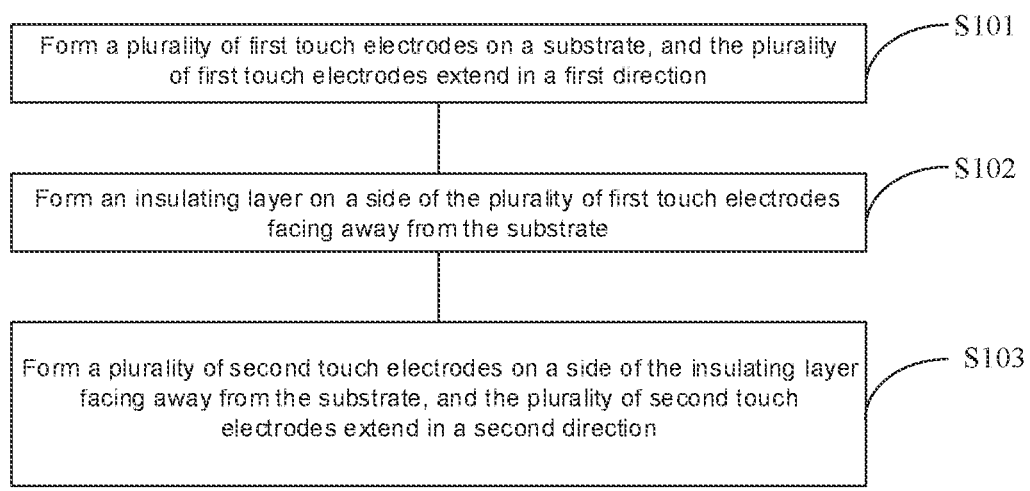
FIG. 8 is a flow diagram of a method for manufacturing a touch substrate, in accordance with some embodiments.

Some embodiments of the present disclosure further provide a method for manufacturing the touch substrate 100. Referring to FIGS. 1A, 6 and 8, the method includes following steps.

In S101, a plurality of first touch electrodes 1 are formed on a substrate 10, and the plurality of first touch electrodes 1 extend in a first direction OX.

As shown in FIG. 2A, each first touch electrode 1 includes a mesh structure 30 and a plurality of dummy electrodes 41. The mesh structure 30 has a plurality of first meshes 301, each first mesh 301 is provided with at least one first dummy electrode 41 therein, and each first dummy electrode 41 is insulated from a first mesh 301 where the first dummy electrode 41 is located.

Here, fabrication processes of forming the first touch electrodes 1 are not limited. In some embodiments, a first conductive film is formed on a side of the substrate 10 first, and then a patterning process is performed on the first conductive film to form the plurality of first touch electrodes 1. For example, the patterning process includes processes such as forming photoresist by a coating process, exposure, development, etching and cleaning.

In addition, before the plurality of first touch electrodes 1 are formed, film layers that have been formed on the substrate 10 are not limited. For example, a black matrix (BM) pattern may be formed on the substrate 10 before the plurality of first touch electrodes 1 are formed.

In another example, a first over coat (OC) layer is first formed on a side of the substrate 10 before the plurality of first touch electrodes 1 are formed, and then the plurality of first touch electrodes 1 are formed on a side of the first over coat layer facing away from the substrate 10. Here, in a process of forming the plurality of first touch electrodes 1, the first over coat layer may play a role of protecting the substrate 10.

In S102, an insulating layer 3 is formed on a side of the plurality of first touch electrodes 1 facing away from the substrate 10.

Here, a material of the insulating layer 3 is not limited. For example, the insulating layer 3 is made of at least one of silicon nitride, silicon oxide or silicon oxynitride.

In S103, a plurality of second touch electrodes 2 are formed on a side of the insulating layer 3 facing away from the substrate 10, and the plurality of second touch electrodes 2 extend in a second direction OY.

As shown in FIG. 2B, each second touch electrode 2 includes a mesh structure 30 and a plurality of first dummy electrodes 41. The mesh structure 30 has a plurality of first meshes 301, each first mesh 301 is provided with at least one first dummy electrode 41 therein, and each first dummy electrode 41 is insulated from a first mesh 301 where the first dummy electrode 41 is located.

Here, fabrication processes of forming the plurality of second touch electrodes 2 are not limited. For example, a second conductive film is formed on the insulating layer 3 first, and then a patterning process is performed on the second conductive film to form the plurality of second touch electrodes 2. For example, the patterning process includes processes such as forming photoresist by a coating process, exposure, development, etching and cleaning.

Referring to FIGS. 1A and 3A, in the touch substrate 100 manufactured through the above method, orthogonal projections of the plurality of first touch electrodes 1 on the substrate 10 intersect with orthogonal projections of the plurality of second touch electrodes 2 on the substrate 10, so as to form a plurality of intersection regions A. In each intersection region A, an orthogonal projection of the mesh structure 30 in the first touch electrode 1 on the substrate 10 and an orthogonal projection of the mesh structure 30 in the second touch electrode 2 on the substrate 10 form a projected mesh structure. The projected mesh structure has a plurality of second meshes 302, an orthogonal projection of each first dummy electrode 41 on the substrate 10 is located in a second mesh 302, and each first dummy electrode 41 includes at least two line segments. The at least two line segments are arranged to intersect, and there is no closed region between/among the at least two line segments. For example, the first dummy electrode in the embodiments may be the first dummy electrode 41 shown in FIG. 2A, 2B, or 3A. For another example, the first dummy electrode in the embodiments may also be the first dummy electrode 41 shown in FIGS. 5A to 5C. In this way, compared with the first dummy electrode shown in FIG. 4, the charges on the first dummy electrode provided in the embodiments are easy to be conducted away, so that the phenomenon of the mesh patterns of light and dark on the screen is not easy to appear during touch.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch substrate, comprising:
a substrate;
a plurality of first touch electrodes disposed on the substrate, the plurality of first touch electrodes extending in a first direction; and
a plurality of second touch electrodes disposed on the substrate, the plurality of second touch electrodes extending in a second direction intersecting with the first direction, and the plurality of second touch electrodes being insulated from the plurality of first touch electrodes; wherein
each first touch electrode and each second touch electrode both include a mesh structure and a plurality of first dummy electrodes; the mesh structure includes a plurality of first meshes, and each first mesh is provided with at least one first dummy electrode therein, and each first dummy electrode is insulated from a first mesh in which the first dummy electrode is located;
orthogonal projections of the plurality of first touch electrodes on the substrate intersect with orthogonal projections of the plurality of second touch electrodes on the substrate to constitute a plurality of intersection regions; in each intersection region, an orthogonal projection of a mesh structure in a first touch electrode on the substrate and an orthogonal projection of a mesh structure in a second touch electrode on the substrate constitute a projected mesh structure; and
the projected mesh structure has a plurality of second meshes, an orthogonal projection of each first dummy electrode on the substrate is located in a second mesh, and each first dummy electrode includes at least two line segments; the at least two line segments are arranged to intersect, and the at least two line segments have no closed region therebetween.

2. The touch substrate according to claim 1, wherein each first dummy electrode and a side of a first mesh in which the first dummy electrode is located have a predetermined distance therebetween.

3. The touch substrate according to claim 2, wherein the predetermined distance is in a range of 4 µm to 12 µm, inclusive.

4. The touch substrate according to claim 1, wherein each second mesh includes:
first sides, the first sides being a portion of the orthogonal projection of the mesh structure in the first touch electrode on the substrate; and
second sides, the second sides being a portion of the orthogonal projection of the mesh structure in the second touch electrode on the substrate; wherein
an orthogonal projection of a first dummy electrode in the first touch electrode on the substrate and a second side of a second mesh in which the first dummy electrode is located are connected to each other or partially coincided with each other; and/or
an orthogonal projection of a first dummy electrode in the second touch electrode on the substrate and a first side of a second mesh in which the first dummy electrode is located are connected to each other or partially coincided with each other.

5. The touch substrate according to claim 1, wherein the first mesh is in a shape of a square, a rectangle, a rhombus or a regular hexagon; and
the second mesh is in a shape of a square, a rectangle, or a rhombus.

6. The touch substrate according to claim 1, wherein an area of the first mesh is an integer multiple of an area of the second mesh.

7. The touch substrate according to claim 1, wherein
the at least two line segments in each first dummy electrode intersect at a same point, and the point is located at a center of a second mesh in which the point is located.

8. The touch substrate according to claim 1, wherein each first dummy electrode includes two line segments intersecting at a same point, and the two line segments are respectively parallel to two adjacent sides of the second mesh in which the two line segments are located.

9. The touch substrate according to claim 1, wherein first meshes in each first touch electrode and first meshes in each second touch electrode are all first rhombus meshes;
two first dummy electrodes in the first touch electrode are disposed in a first rhombus mesh in the first touch electrode, and are arranged at intervals in a direction of a first diagonal of the first rhombus mesh; and
two first dummy electrodes in the second touch electrode are disposed in a first rhombus mesh in the second touch electrode, and are arranged at intervals in a direction of a second diagonal of the first rhombus mesh; wherein
the first diagonal of the first rhombus mesh in the first touch electrode and the second diagonal of the first rhombus mesh in the second touch electrode are spatially perpendicular to each other.

10. The touch substrate according to claim 9, wherein the second mesh is a second rhombus mesh, all sides of the second rhombus mesh are respectively parallel to all sides of the first rhombus mesh, and an area of the second rhombus mesh is a quarter of an area of the first rhombus mesh.

11. The touch substrate according to claim 10, wherein each first dummy electrode includes two line segments intersecting at a same point, an orthogonal projection of the point of the two line segments on the substrate is located at a center of the second rhombus mesh in which the two line segments are located, and the two line segments are respectively parallel to two adjacent sides of the second rhombus mesh in which the two line segments are located.

12. The touch substrate according to claim 1, further comprising:
a plurality of second dummy electrodes disposed in a same layer as the first touch electrodes and located between two adjacent first touch electrodes; and/or
a plurality of third dummy electrodes disposed in a same layer as the second touch electrodes and located between two adjacent second touch electrodes.

13. The touch substrate according to claim 1, wherein
a distance between two adjacent first touch electrodes is in a range of 40 µm to 50 µm, inclusive; and/or
a distance between two adjacent second touch electrodes is in a range of 40 µm to 50 µm, inclusive.

14. The touch substrate according to claim 1, wherein the plurality of first touch electrodes are a plurality of driving electrodes, and the plurality of second touch electrodes are a plurality of sensing electrodes; or
the plurality of first touch electrodes are the plurality of sensing electrodes, and the plurality of second touch electrodes are the plurality of driving electrodes.

15. The touch substrate according to claim 1, further comprising:
an insulating layer disposed between the plurality of second touch electrodes and the plurality of first touch electrodes, so that the plurality of second touch electrodes are insulated from the plurality of first touch electrodes.

16. A touch display apparatus, comprising:
the touch substrate according to claim 1.

17. The touch display apparatus according to claim 16, wherein the substrate of the touch substrate is a cover plate; or
the substrate of the touch substrate is a color filter substrate; or
the touch display apparatus further comprises a display substrate, and the substrate of the touch substrate is an encapsulation layer for encapsulating the display substrate.

18. The touch display apparatus according to claim 16, wherein the touch display apparatus is a liquid crystal display apparatus, and the liquid crystal display apparatus includes an array substrate and an opposite substrate that are disposed opposite to each other, and liquid crystals between the array substrate and the opposite substrate; and
the substrate of the touch substrate is the opposite substrate, and the plurality of first touch electrodes and the plurality of second touch electrodes in the touch substrate are located on a side of the opposite substrate away from the liquid crystals.

19. The touch display apparatus according to claim 16, further comprising:
a polarizer disposed on a side of the plurality of first touch electrodes and the plurality of second touch electrodes in the touch substrate away from the substrate of the touch substrate.

20. The touch display apparatus according to claim 19, further comprising:

an adhesive layer disposed between the polarizer and the touch substrate; a resistivity of the adhesive layer is in a range of $10^8$ Ω·m to $10^{11}$ Ω·m, inclusive.

* * * * *